US012176782B2

(12) United States Patent
Shi et al.

(10) Patent No.: US 12,176,782 B2
(45) Date of Patent: Dec. 24, 2024

(54) VIBRATION APPARATUS WITH MOVING MAGNET GROUP AND MAGNET GROUP INSIDE COIL

(71) Applicant: GOERTEK INC., Shandong (CN)

(72) Inventors: Dezhang Shi, Shandong (CN); Dongsheng Mao, Shandong (CN); Zhiming Gao, Shandong (CN); Wenhua Gao, Shandong (CN)

(73) Assignee: GOERTEK INC., Weifang (CN)

( * ) Notice: Subject to any disclaimer, the term of this patent is extended or adjusted under 35 U.S.C. 154(b) by 237 days.

(21) Appl. No.: 17/786,589

(22) PCT Filed: Dec. 5, 2020

(86) PCT No.: PCT/CN2020/134105
§ 371 (c)(1),
(2) Date: Jun. 17, 2022

(87) PCT Pub. No.: WO2021/121055
PCT Pub. Date: Jun. 24, 2021

(65) Prior Publication Data
US 2023/0015265 A1 Jan. 19, 2023

(30) Foreign Application Priority Data
Dec. 19, 2019 (CN) .......................... 201911320565.7

(51) Int. Cl.
*H02K 33/00* (2006.01)
(52) U.S. Cl.
CPC .................................. *H02K 33/00* (2013.01)
(58) Field of Classification Search
CPC ........ H02K 35/00; H02K 35/02; H02K 35/04; H02K 35/06; H02K 7/1869; H02K 7/1876;
(Continued)

(56) References Cited

U.S. PATENT DOCUMENTS

| 4,346,318 A | * | 8/1982 | Shtrikman | ............. | H02K 33/06 310/12.24 |
| 4,831,292 A | * | 5/1989 | Berry | ..................... | H02K 33/06 310/23 |

(Continued)

FOREIGN PATENT DOCUMENTS

| CN | 202121478 U | 1/2012 |
| CN | 206349903 U | 7/2017 |

(Continued)

OTHER PUBLICATIONS

International Search Report from International Application No. PCT/CN2020/134105 mailed on Mar. 3, 2021.

*Primary Examiner* — Maged M Almawri
(74) *Attorney, Agent, or Firm* — Shih IP Law Group, PLLC

(57) ABSTRACT

A vibration apparatus comprising: a vibration assembly comprising a counterweight block, a first magnet group and an elastic member, the first magnet group is fixed on the counterweight block, the vibration assembly is suspended in the vibration apparatus through the elastic member; a stator assembly comprising a coil and a second magnet group, the second magnet group is installed in a winding hole of the coil; the first magnet group comprises at least two side magnets, magnetization directions of the two side magnets are perpendicular to a plane on which the coil is located, the side magnets are magnetized in opposite directions, a magnetization direction of the second magnet group is parallel to the plane, two poles of second magnet group are respectively attracted to poles of side magnets adjacent to the coil, the vibration assembly is configured to produce vibration relative to the stator assembly.

9 Claims, 3 Drawing Sheets

(58) Field of Classification Search
CPC ...... H02K 7/1892; H02K 33/00; H02K 33/02; H02K 33/16
USPC ............. 310/15–30, 12, 81, 80, 321, 36–37, 310/40 MM
See application file for complete search history.

(56) References Cited

U.S. PATENT DOCUMENTS

| | | | | |
|---|---|---|---|---|
| 5,587,615 | A * | 12/1996 | Murray | H02K 33/16 310/15 |
| 6,914,351 | B2 * | 7/2005 | Chertok | H02K 35/02 310/12.26 |
| 7,633,189 | B2 * | 12/2009 | Iwasa | H02K 41/03 310/15 |
| 7,671,493 | B2 * | 3/2010 | Takashima | G06F 3/016 310/15 |
| 7,687,943 | B2 * | 3/2010 | Lunde | H02K 7/1846 310/58 |
| 8,278,786 | B2 * | 10/2012 | Woo | H02K 33/16 310/15 |
| 8,358,039 | B2 * | 1/2013 | Trumper | G01Q 10/04 310/12.24 |
| 8,456,032 | B2 * | 6/2013 | Hochberg | H02K 21/12 290/43 |
| 8,648,502 | B2 * | 2/2014 | Park | H02K 33/16 310/15 |
| 8,704,387 | B2 * | 4/2014 | Lemieux | F03G 7/08 290/1 R |
| 8,941,251 | B2 * | 1/2015 | Zuo | H02K 35/02 290/1 R |
| 8,941,272 | B2 * | 1/2015 | Hong | H02K 33/18 310/15 |
| 9,024,489 | B2 * | 5/2015 | Akanuma | H02K 33/16 310/15 |
| 9,225,265 | B2 * | 12/2015 | Oh | G06F 3/016 |
| 9,240,267 | B2 * | 1/2016 | Nagahara | H02K 35/02 |
| 9,306,429 | B2 * | 4/2016 | Akanuma | H02K 33/16 |
| 9,543,816 | B2 * | 1/2017 | Nakamura | H02K 33/16 |
| 9,748,827 | B2 * | 8/2017 | Dong | H02K 33/16 |
| 9,948,170 | B2 * | 4/2018 | Jun | H02K 33/00 |
| 10,033,257 | B2 * | 7/2018 | Zhang | H02K 33/12 |
| 10,063,128 | B2 * | 8/2018 | Wang | H02K 33/16 |
| 10,160,010 | B2 * | 12/2018 | Chun | H02K 33/16 |
| 10,307,791 | B2 * | 6/2019 | Xu | B06B 1/045 |
| 10,328,461 | B2 * | 6/2019 | Xu | B06B 1/045 |
| 10,404,150 | B2 * | 9/2019 | Swanson | H02K 35/06 |
| 10,447,133 | B2 * | 10/2019 | Jin | H02K 33/18 |
| 10,483,451 | B2 * | 11/2019 | Wang | B06B 1/045 |
| 10,486,196 | B2 * | 11/2019 | Chai | B06B 1/045 |
| 10,491,090 | B2 * | 11/2019 | Zu | H02K 33/16 |
| 10,581,355 | B1 * | 3/2020 | Dyson | H02P 6/005 |
| 10,596,596 | B2 * | 3/2020 | Ling | B06B 1/045 |
| 10,674,278 | B2 * | 6/2020 | Zhou | H04R 9/025 |
| 10,763,732 | B2 * | 9/2020 | Liu | H02K 33/18 |
| 10,886,827 | B2 * | 1/2021 | Liu | H02K 33/14 |
| 10,930,838 | B1 * | 2/2021 | Miesner | H02N 2/043 |
| 10,931,185 | B2 * | 2/2021 | Tang | H02K 33/12 |
| 10,998,487 | B1 * | 5/2021 | Miesner | H10N 35/80 |
| 11,050,334 | B2 * | 6/2021 | Mori | H02K 33/18 |
| 11,522,429 | B2 * | 12/2022 | Takahashi | H02K 33/06 |
| 2003/0127916 | A1 * | 7/2003 | Godkin | H02K 41/0356 310/12.16 |
| 2006/0044093 | A1 * | 3/2006 | Ohta | H02K 99/20 335/220 |
| 2008/0174187 | A1 * | 7/2008 | Erixon | H02K 33/16 310/15 |
| 2009/0267423 | A1 * | 10/2009 | Kajiwara | H02K 33/02 310/38 |
| 2010/0213773 | A1 * | 8/2010 | Dong | H02K 33/16 310/25 |
| 2011/0018364 | A1 * | 1/2011 | Kim | H02K 33/18 310/20 |
| 2011/0018365 | A1 | 1/2011 | Kim et al. | |
| 2011/0068640 | A1 * | 3/2011 | Choi | H02K 5/04 310/25 |
| 2011/0089772 | A1 * | 4/2011 | Dong | H02K 33/16 310/25 |
| 2011/0115311 | A1 * | 5/2011 | Dong | H02K 33/16 310/28 |
| 2011/0133577 | A1 * | 6/2011 | Lee | H02K 33/18 310/15 |
| 2012/0153748 | A1 * | 6/2012 | Wauke | H02K 33/16 310/25 |
| 2012/0187780 | A1 * | 7/2012 | Bang | H02K 33/16 310/25 |
| 2012/0242086 | A1 * | 9/2012 | Yang | H02K 35/02 290/50 |
| 2012/0242175 | A1 * | 9/2012 | Yang | H02K 35/02 310/30 |
| 2012/0313459 | A1 * | 12/2012 | Zhang | H02K 33/18 310/25 |
| 2013/0093266 | A1 * | 4/2013 | Hong | H02K 33/18 29/446 |
| 2013/0099600 | A1 * | 4/2013 | Park | B06B 1/045 310/15 |
| 2013/0169071 | A1 * | 7/2013 | Endo | H02K 33/12 310/25 |
| 2014/0054983 | A1 * | 2/2014 | Moon | H02K 33/16 310/28 |
| 2014/0062224 | A1 * | 3/2014 | Kim | H02K 33/16 310/15 |
| 2014/0346901 | A1 * | 11/2014 | Hayward | H02K 15/14 310/25 |
| 2016/0173990 | A1 * | 6/2016 | Park | H04R 9/043 381/354 |
| 2017/0033657 | A1 * | 2/2017 | Mao | H02K 33/16 |
| 2017/0110920 | A1 * | 4/2017 | Mao | H02K 1/34 |
| 2017/0288519 | A1 * | 10/2017 | Kim | H02K 33/16 |
| 2018/0021812 | A1 * | 1/2018 | Akanuma | H02K 33/00 310/25 |
| 2019/0044425 | A1 * | 2/2019 | Zu | H02K 33/02 |
| 2020/0044538 | A1 * | 2/2020 | Tang | H02K 33/18 |
| 2020/0212786 | A1 * | 7/2020 | Ling | H02K 33/18 |
| 2020/0412221 | A1 * | 12/2020 | Yan | H02K 33/16 |
| 2020/0412226 | A1 * | 12/2020 | Ma | H02K 33/16 |
| 2020/0412228 | A1 * | 12/2020 | Mao | H02K 33/18 |
| 2021/0075306 | A1 * | 3/2021 | Little | H02K 33/02 |
| 2022/0255412 | A1 * | 8/2022 | Wang | H02K 33/16 |

FOREIGN PATENT DOCUMENTS

| | | |
|---|---|---|
| CN | 107147267 A | 9/2017 |
| CN | 207475380 U | 6/2018 |
| CN | 207530692 U | 6/2018 |
| CN | 108348959 A | 7/2018 |
| CN | 111082630 A | 4/2020 |
| JP | 2008306836 A | 12/2008 |
| KR | 20150078045 A | 7/2015 |

* cited by examiner

VIBRATION APPARATUS WITH MOVING MAGNET GROUP AND MAGNET GROUP INSIDE COIL

TECHNICAL FIELD

The present disclosure relates to the technical field of micro-vibration, and more particularly, relates to a vibration apparatus.

BACKGROUND ART

Vibration motors are mostly used in portable electronic products, such as mobile phones, handheld game consoles and handheld multimedia entertainment devices, etc. The vibration motor generally includes a housing, a stator and a vibrator, the stator includes a coil fixed on the housing, the vibrator includes a permanent magnet corresponding to the coil and a mass block integrally fixed with the permanent magnet, and the vibrator is suspended in the housing by an elastic support member.

An X-direction vibration motor is a linear vibration motor in which the vibrator vibrates in the X-direction. The existing X-direction vibration motor has poor centering effect of the vibrator during the vibration process, and is prone to generate excessive offset vibration under the action of external force. In the meanwhile, under the inertial action of the mass block, after the vibration motor is powered off, the inertial vibrate of the vibrator lasts a long time, which affects the user experience.

Therefore, it is necessary to propose a new vibration motor to overcome the defects of existing vibration motors.

SUMMARY

An object of the present disclosure is to provide a vibration apparatus which solves the problem of poor centering effect of the vibrator in the prior art.

The present disclosure provides a vibration apparatus, including:
- a vibration assembly including a counterweight block, a first magnet group and an elastic member, the first magnet group is fixed on the counterweight block, and the vibration assembly is suspended in the vibration apparatus through the elastic member;
- a stator assembly including a coil and a second magnet group, the second magnet group is installed in a winding hole of the coil;
- wherein the first magnet group includes at least two side magnets, and magnetization directions of the two side magnets are both perpendicular to a plane on which the coil is located, and the two side magnets are magnetized in directions opposite to each other;
- a magnetization direction of the second magnet group is parallel to the plane on which the coil is located, and two poles of the second magnet group and magnetic poles of the two side magnets adjacent to the coil are attracted to each other respectively;
- the vibration assembly is configured to produce vibration relative to the stator assembly.

Optionally, the vibration apparatus includes a first housing and a second housing, and the second housing is combined to the first housing to form an inner cavity of the vibration apparatus;
the vibration assembly is suspended in the inner cavity; in the inner cavity, the stator assembly is fixed on the first housing.

Optionally, an edge of the first housing is provided with a connecting portion corresponding to the elastic member, and the elastic member is connected to the connecting portion; the connecting portion is recessed inward relative to the edge of the first housing.

Optionally, a partial region of the edge of the first housing protrudes outward, and is bent to form the connecting portion.

Optionally, the first housing has a rectangular structure, and the connecting portion is disposed on a short side of the rectangular structure.

Optionally, the first magnet group further includes a center magnet, the center magnet is interposed between the two side magnets; a magnetization direction of the center magnet is opposite to the magnetization direction of the second magnet group.

Optionally, the elastic member is disposed in pairs on opposite sides of the counterweight block.

Optionally, a hollow area is formed in a central position of the counterweight block, and the first magnet group is embedded and installed in the hollow area.

Optionally, the elastic member is provided in a V-shaped structure.

Optionally, a height of the elastic member is the same as a height of the counterweight block in a direction perpendicular to the plane on which the coil is located.

The beneficial effect of the technical solution of the present disclosure is that an attraction to the first magnet group is generated by the second magnet group, which can form a centering effect on the vibration assembly and shorten the time of inertial vibration of the vibration assembly.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of this specification, illustrate embodiments of the present disclosure, and together with the description serve to explain the principles of the invention.

Figure 1:
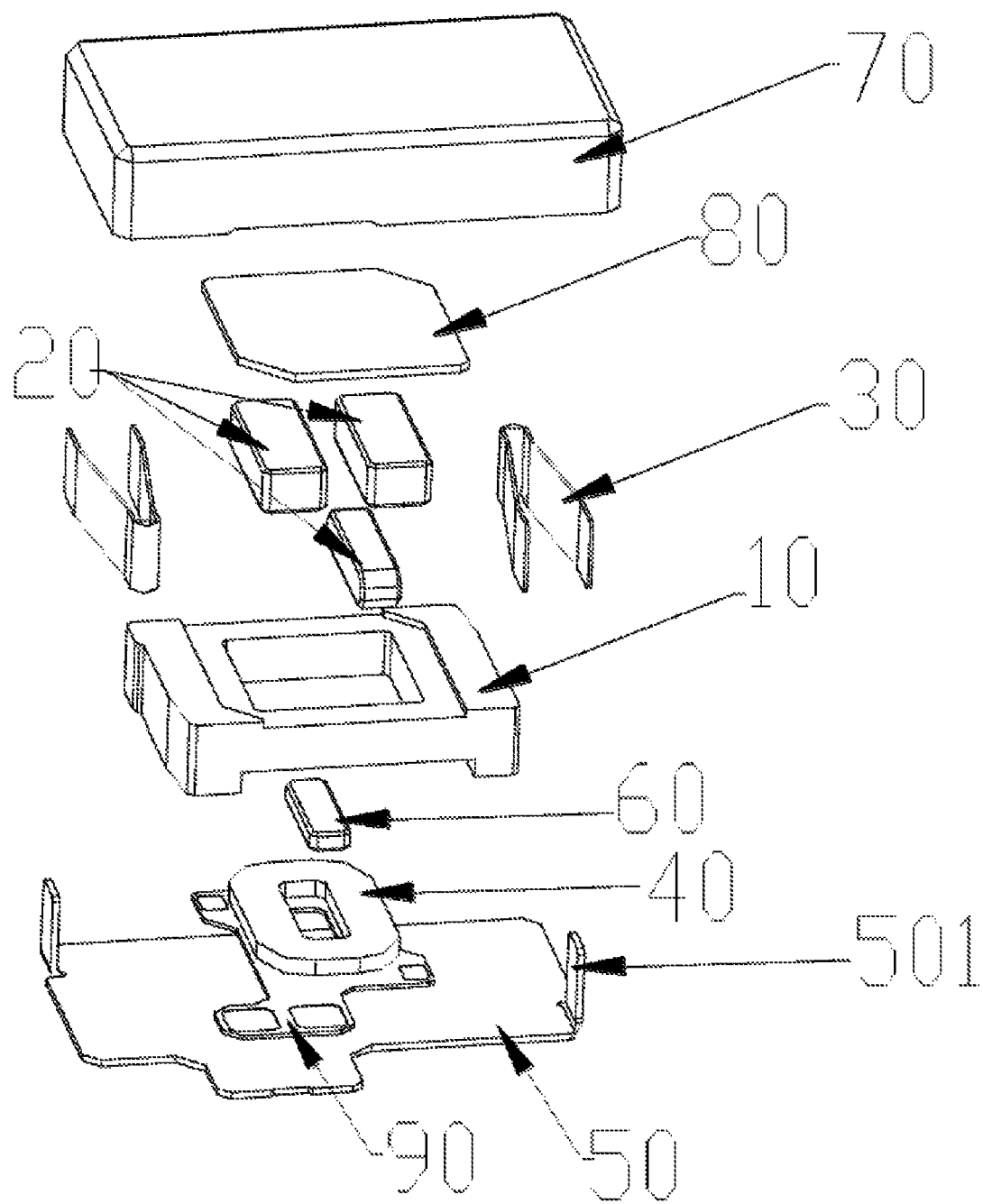
FIG. 1 is an exploded view of a vibration apparatus according to an embodiment of the present disclosure.

Reference numerals: 10—counterweight block; 20—first magnet group; 201—side magnet; 202—side magnet; 203—center magnet; 30—elastic member; 40—coil; 50—first housing; 501—connecting portion; 60—second magnet group; 70—second housing; 80—washer; 90—flexible circuit board (FPCB).

DETAILED DESCRIPTION OF THE EMBODIMENTS

Various exemplary embodiments of the present disclosure will now be described in detail with reference to the following drawings. It should be noted that the relative arrangement of components and steps, the numerical expressions and numerical values set forth in these embodiments do not limit the scope of the disclosure unless specifically stated otherwise.

The following description of at least one exemplary embodiment is in fact merely illustrative and is in no way intended to limit the present disclosure and the applications or uses thereof.

Techniques, methods, and apparatus known to those of ordinary skill in the relevant art may not be described in detail, but such techniques, methods, and apparatus should be considered a part of the specification according to appropriate circumstance.

In all examples illustrated and described herein, any specific values should be construed as illustrative only instead of a limitation. Accordingly, other examples of the exemplary embodiment may have different values.

It should be noted that like reference numbers and letters refer to like items in the following drawings, therefore once a certain item is defined in one drawing, it is does not require further explained in subsequent drawings.

In the prior art, the assembly symmetry of vibrator of the vibration motor is poor, and the centering effect of vibrator vibration is poor, which greatly affects the performance of the motor. Meanwhile, after the product is powered off, the inertial vibration of the vibrator lasts for a long time, which greatly reduces the user experience satisfaction. Therefore, it is necessary to propose a new vibration apparatus to overcome the above-described defects.

The present disclosure provides a vibration apparatus, including: a vibration assembly, including a counterweight block, a first magnet group and an elastic member, the first magnet group is fixed on the counterweight block, and the vibration assembly is suspended in the vibration apparatus through the elastic member; and a stator assembly, including a coil and a second magnet group, and the second magnet group is installed in a winding hole of the coil; wherein the first magnet group includes at least two side magnets, and magnetization directions of the two side magnets are both perpendicular to a plane on which the coil is located, and the two side magnets are magnetized in directions opposite to each other; a magnetization direction of the second magnet group is parallel to the plane on which the coil is located, and two poles of the second magnet group and magnetic poles of the two side magnets adjacent to the coil are attracted to each other respectively; the vibration assembly is configured to produce vibration relative to the stator assembly.

The vibration apparatus of the present disclosure may be a vibration motor, an exciter, etc.; however, the present disclosure is not limited thereto.

Figure 2:
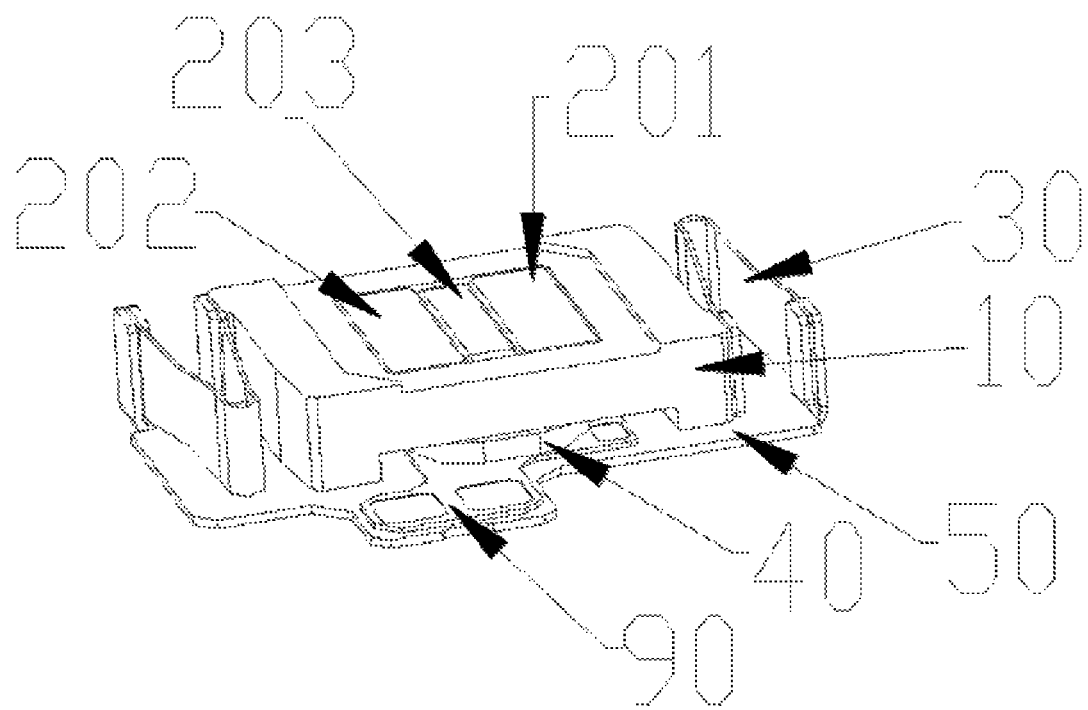
FIG. 2 is a schematic structural diagram of a vibration apparatus according to an embodiment of the present disclosure.

As an embodiment of the present disclosure, as illustrated in FIG. 1 or FIG. 2, the vibration apparatus includes a vibration assembly. Optionally, the vibration assembly is used as a vibrator of the vibration apparatus and is suspended in the vibration apparatus. The vibration assembly includes a counterweight block 10. When the vibration assembly vibrates, the counterweight block is used to provide a larger mass, so as to increase the vibration inertial force of the vibrator, thereby increasing the vibration amplitude. Optionally, as the counterweight block of the present disclosure, a tungsten steel block may be adopted. The density of the tungsten steel block is relatively higher, and the mass of the tungsten steel block is relatively larger among metal blocks of the same volume. Therefore, the volume of the counterweight block made from the tungsten steel block is small, which is beneficial to reduce the volume of the vibration apparatus. The vibration assembly further includes a first magnet group 20, and the first magnet group is fixedly disposed on the counterweight block. In this way, when the first magnet group vibrates, the mass of the counterweight block can be used to increase the vibration amplitude of the first magnet group. Optionally, the vibration assembly further includes an elastic member 30, and the elastic member is fixedly connected with the counterweight block. The function of the elastic member is to provide vibration damping for the vibrator, and prevent the vibrator from colliding with other components of the vibration apparatus due to excessive vibration amplitude. In the meanwhile, the elastic member provides the vibrator with vibration restoring force and promotes the reciprocating vibration of the vibrator. Optionally, the vibration assembly is suspended in the vibration apparatus through the elastic member. The vibration apparatus further includes a stator assembly. The stator assembly includes a coil 40 and a second magnet group 60. The second magnet group is installed in a winding hole of the coil, and the winding hole of the coil refers to a hole left in a center position of the coil after the coil is wound. The first magnet group includes at least two side magnets. Optionally, referring to FIG. 3, the two side magnets have exactly identical sizes and opposite magnetization directions. The magnetization direction described herein refers to a direction from S pole to N pole in the magnet. The magnetization directions of the two side magnets are perpendicular to the plane on which the coil is located. The two side magnets are parallel to each other and disposed symmetrically with respect to the center of the coil. The second magnet group 60 includes one magnet whose magnetization direction is parallel to the plane on which the coil is located. The two poles of the second magnet group and the magnetic poles of the two side magnets adjacent to the coil are attracted to each other respectively. Specifically, the second magnet group is disposed parallel to the plane on which the coil is located, and the magnetization direction of the second magnet group is along the arrangement direction of the second magnet group. The two magnetic poles of the two side magnets adjacent to the voice coil are the S pole and the N pole, respectively, the N pole of the second magnet group and the S pole of the side magnets adjacent to the voice coil attract each other, the S pole of the second magnet group and the N pole of the side magnets adjacent to the voice coil attract each other. In this structure, in a static state of the vibration apparatus, the second magnet group generates symmetrical attractions to the two side magnets. The attractions can increase the number of magnetic induction lines of the side magnet 201 and the side magnet 202 passing through the coil 40, thereby improving the utilization rate of the magnetic flux by the coil. Meanwhile, the existence of the attraction can ensure that the vibration assembly generates symmetrical vibration with respect to the center position of the vibration apparatus, and can prevent excessive vibration of the vibration assembly. In addition, after the coil is powered off, the attraction can shorten the time of the inertial vibration of the vibration assembly, resulting in a magnetic damping effect on the vibration assembly.

In the present disclosure, the vibration assembly can vibrate relative to the stator assembly. As an embodiment, the vibration assembly is suspended above the stator assembly. When an alternating current is supplied to the coil 40, the coil is subjected to an ampere force, and the movement of the coil generates a reaction force applied on the first magnet group 20, such that the vibration assembly vibrates in a direction in the horizontal plane. The second magnet group 60 generates symmetrical attraction to the two side magnets of the first magnet group, which can alleviate the polarization of the vibration assembly deviating from the vibration direction. The vibration apparatus further includes a flexible circuit board (FPCB) 90, which is used for supplying an electrical signal to the coil. Optionally, the FPCB is connected to a side of the coil far away from the first magnet group. Optionally, pins are provided on the FPCB for connection with external circuits. Optionally, the vibration apparatus further includes a washer 80. The washer is used to conduct magnetism for the first magnet group.

The present disclosure utilizes the second magnet group 60 to attract the first magnet group 20 to generate symmetrical attraction to the two side magnets of the first magnet group, can form an excellent centering effect on the vibration assembly and improve the vibration performance of the vibration apparatus. Meanwhile, the existence of the attraction has a magnetic damping effect on the vibration assembly, which can shorten the time of the vibration assembly from power-off to stop of vibration, and effectively improve the user experience.

Optionally, the vibration apparatus includes a first housing and a second housing, the second housing is combined to the first housing to form an inner cavity of the vibration apparatus; the vibration assembly is suspended in the inner cavity; in the inner cavity, the stator assembly is fixed on the first housing.

As an embodiment of the present disclosure, as illustrated in FIG. 1, the vibration apparatus includes a first housing 50 and a second housing 70. Optionally, the second housing may be provided as a box structure. After the installation of the vibration assembly and the stator assembly, the second housing provided as the box structure is combined and connected to the first housing, and components of the vibration apparatus are accommodated in the inner cavity formed by the first housing and the second housing. Specifically, the vibration assembly is suspended in the above-described inner cavity. The elastic member 30 may be connected to the first housing or the second housing, so that the vibration assembly is suspended in the above-described inner cavity. Optionally, in the inner cavity, the stator assembly is fixed on the first housing. Specifically, the coil is fixed on the first housing through the flexible circuit board 90, and the second magnet group 60 is installed in the winding hole of the coil. In the present disclosure, the first housing and the second housing can be used to protect the components of the vibration apparatus so as to prevent external factors from interfering with the motion of the vibration apparatus.

Optionally, an edge of the first housing is provided with a connecting portion corresponding to the elastic member, and the elastic member is connected to the connecting portion; the connecting portion is recessed inward relative to the edge of the first housing.

As an embodiment of the present disclosure, as illustrated in FIG. 2, the elastic member 30 is connected to the first housing 50. Specifically, the edge of the first housing is provided with a connecting portion 501, and the elastic member is fixedly connected with the connecting portion 501, so that one end of the elastic member is fixed, and thereby implementing the elastic recovery function of the elastic member. The elastic member of the present disclosure may be a spring or an elastic sheet, which is not limited by the present disclosure. Optionally, referring to FIG. 4, the connecting portion 501 of the present disclosure is recessed inward relative to the edge of the first housing, that is, the connecting portion is recessed toward the center of the first housing, to provide a certain escape distance at the edge of the first housing. This structure is convenient for the second housing 70 to be combined and installed on the first housing, thereby maximizing the accommodation space for components in the vibration apparatus. Optionally, the escape distance of the connecting portion may be the wall thickness of the second housing. This is beneficial to fully utilize the external dimensions of the second housing to form the largest accommodating space. Alternatively, the escape distance of the connecting portion is greater than the wall thickness of the second housing, so as to avoid vibration interference between the vibration assembly and the second housing.

Optionally, a partial region of the edge of the first housing protrudes outward and is bent to form the connecting portion.

Figure 4:
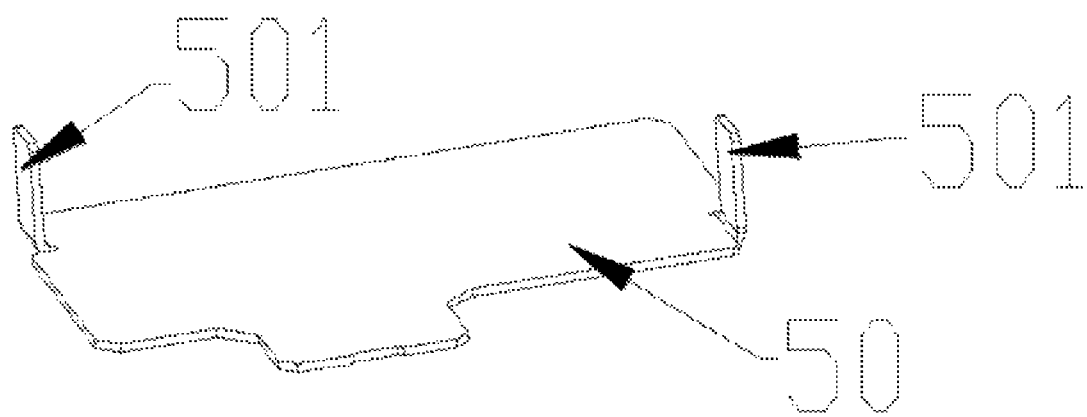
FIG. 4 is a schematic structural diagram of a first housing according to an embodiment of the present disclosure.

According to an embodiment of the present disclosure, as illustrated in FIG. 4, the edge of the first housing 50 partially protrudes outward relative to a connection position with the elastic member 30, and then the protruding portion is bent toward the vibration assembly to form the connecting portion 501. The vibration assembly is connected to the connecting portion of the first housing, and the installation symmetry of the vibration assembly can be improved by means of detection and adjustment, so as to ensure the vibration performance of the vibration apparatus.

Optionally, the first housing has a rectangular structure, and the connecting portion is disposed on a short side of the rectangular structure.

As an embodiment of the present disclosure, referring to FIG. 1, the first housing 70 is provided as a rectangular structure. The connecting portion 501 is disposed on the short side of the rectangular structure, so that the vibration assembly can be disposed along the long side of the rectangular structure so as to increase the installation space of the vibration assembly, and accordingly facilitate the installation of the vibration assembly. Meanwhile, by disposing the vibration assembly along the long side of the rectangular structure, the vibration space of the vibration assembly can be increased and the probability that vibration interference occurs between the vibration assembly and other components can be reduced.

Optionally, the first magnet group further includes a center magnet, the center magnet is interposed between the two side magnets; the magnetization direction of the center magnet is opposite to the magnetization direction of the second magnet group.

Figure 3:
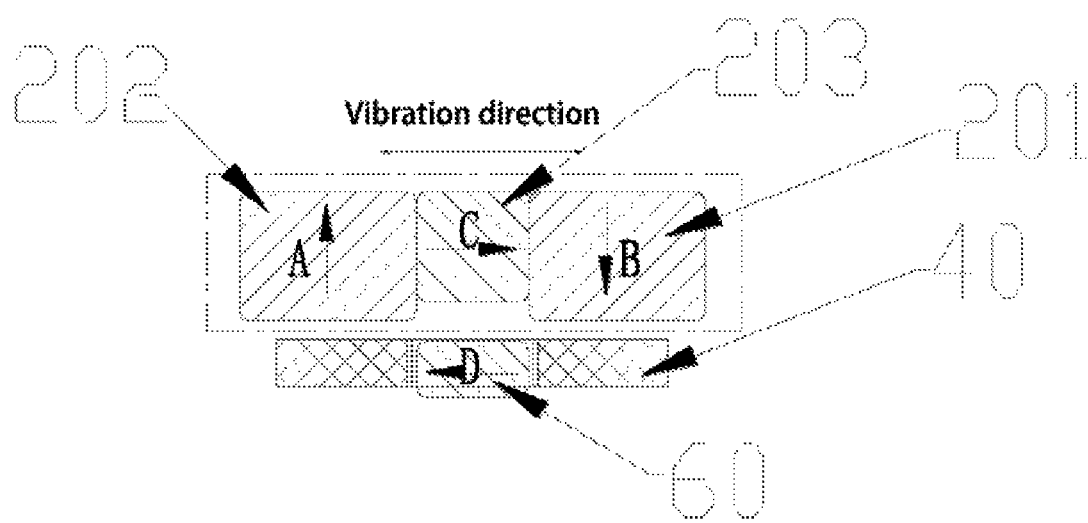
FIG. 3 is a schematic diagram illustrating magnetization directions of a magnet group of a vibration apparatus according to an embodiment of the present disclosure.

As an embodiment of the present disclosure, as illustrated in FIG. 3, the first magnet group 20 includes a side magnet 201 and a side magnet 202. The two side magnets have exactly identical structure and equal magnetic field strength. The first magnet group further includes a center magnet 203. The center magnet is interposed between the two side magnets, and the two side magnets are arranged symmetrically with respect to the center magnet. The center magnet is used to enhance the magnetic field strength of the first magnet group. As an example, the magnetization direction of the center magnet is opposite to the magnetization direction of the second magnet group. This arrangement can further increase the attraction between the first magnet group and the second magnet group.

Optionally, the elastic member is disposed in pairs on opposite sides of the counterweight block.

As an embodiment, referring to FIG. 3, the vibration assembly includes the elastic member 30 disposed in pairs, and the elastic members are symmetrically distributed with respect to the center of the counterweight block 10. One end of the elastic member is connected with the counterweight block. The function of the elastic member is to provide the vibrator with vibration damping, and prevent the vibrator from colliding with other components of the vibration apparatus due to excessive vibration amplitude. In the meanwhile, the elastic members disposed in pairs provide the vibrator with vibration restoring force and promote the reciprocating vibration of the vibrator.

Optionally, a hollow area is formed in a central position of the counterweight block, and the first magnet group is embedded and installed in the hollow area.

In the present disclosure, the central position of the counterweight block 10 is designed as a hollow structure, as illustrated in FIG. 1. The first magnet group 20 is embedded and installed in the hollow area. By designing the central position of the counterweight block as a hollow structure for installing the first magnet group, a overall height of the vibration assembly can be reduced, the installation space of the vibration assembly in the vibration apparatus can be reduced, which is beneficial to reduce the size of the vibration apparatus, and on the other hand, the magnetic shielding to the first magnet group by the counterweight block can be reduced, and the utilization rate of the magnetic flux by the coil can be improved. Optionally, the first magnet group may be installed on the counterweight block by means of bonding, or the first magnet group may be installed on the counterweight block by interference fitting with the hollow area, but the present disclosure does not limit the method of installing the first magnet group on the counterweight block.

Optionally, the elastic member is provided in a V-shaped structure, and outer side surfaces of two ends of the V-shaped structure are respectively connected to the counterweight block and the connecting portion.

As an embodiment of the present disclosure, the elastic member 30 may be provided in a V-shaped structure. The outer side surface of one end of the V-shaped structure is connected to an outer side surface of the counterweight block 10, and the outer side surface of the other end of the V-shaped structure is connected to the connecting portion 501. Optionally, the ends of the V-shaped structure can be fixedly connected to the counterweight block and the connecting portion by welding, respectively. Optionally, the material of the elastic member is metal elastic material. The elastic member is provided in a V-shaped structure, and provides a reciprocating force to the vibration assembly to vibrate by using the elastic restoring force at both ends of the V-shaped structure. The elastic member with the V-shaped structure is simple in structure and convenient in processing, which is beneficial to simplify the process of installing the elastic member. Optionally, the connecting portion may be disposed at a position on the short side of the rectangular structure adjacent to a corner portion, accordingly, the length of the V-shaped structure can be increased, and the deformability of the elastic member can be increased.

The elastic member 30 of the present disclosure may also be provided with other structures capable of generating an elastic restoring force, which is not limited in the present disclosure.

Optionally, a height of the elastic member is the same as a height of the counterweight block in a direction perpendicular to the plane on which the coil is located.

As an embodiment of the present disclosure, the elastic member 30 is disposed at the same height as the counterweight block 10 along the direction perpendicular to the plane on which the coil 40 is located, so that the connection area between the elastic member and the counterweight block can be increased, and the connection strength between the elastic member and the counterweight block can be improved. Meanwhile, by disposing the elastic member and the counterweight block at the same height, not only the structural strength of the elastic member can be improved, but also the utilization rate of the space inside the vibration apparatus can be increased. Optionally, the connecting portion 501 may be configured to have the same height as the elastic member 30, so that the connection area between the elastic member and the connecting portion can be increased, and the connection strength between the elastic member and the connecting portion can be improved.

In the present disclosure, by providing the first magnet group capable of generating an attraction to the second magnet group, a centering effect on the vibration assembly can be formed, the time of inertial vibration of the vibration assembly can be shortened, and meanwhile, connecting the vibration assembly to the connecting portion in an adjustable manner can improve the installation accuracy, ensure the installation symmetry of the vibration assembly, and furthermore improve the vibration performance of the vibration apparatus.

Although some specific embodiments of the present disclosure have been described in detail by way of examples, those skilled in the art should understand that the above examples are provided for illustration only but are not for the purpose of limiting the scope of the present disclosure. Those skilled in the art will appreciate that modifications may be made to the above embodiments without departing from the scope and spirit of the present disclosure. The scope of the present disclosure is defined by the appended claims.

What is claimed is:

1. A vibration apparatus, comprising:
   a vibration assembly comprising a counterweight block, a first magnet group and an elastic member, the first magnet group is fixed on the counterweight block, and the vibration assembly is suspended in the vibration apparatus through the elastic member; and
   a stator assembly comprising a coil and a second magnet group, the second magnet group is installed in a winding hole of the coil,
   wherein, the first magnet group comprises at least two side magnets, and magnetization directions of the two side magnets are both perpendicular to a plane on which the coil is located, and the two side magnets are magnetized in directions opposite to each other,
   wherein a magnetization direction of the second magnet group is parallel to the plane on which the coil is located, and two poles of the second magnet group and magnetic poles of the two side magnets adjacent to the coil are attracted to each other respectively,
   wherein the first magnet group further comprises a center magnet, the center magnet is interposed between the two side magnets, and a magnetization direction of the center magnet is opposite to the magnetization direction of the second magnet group, and
   wherein the vibration assembly is configured to produce vibration relative to the stator assembly.

2. The vibration apparatus of claim 1, wherein a hollow area is formed in a central position of the counterweight block, and the first magnet group is embedded and installed in the hollow area.

3. The vibration apparatus of claim 1, wherein the elastic member is disposed in pairs on opposite sides of the counterweight block.

4. The vibration apparatus of claim 3, wherein the elastic member is provided in a V-shaped structure.

5. The vibration apparatus of claim 3, wherein a height of the elastic member is the same as a height of the counterweight block in a direction perpendicular to the plane on which the coil is located.

6. The vibration apparatus of claim 1, wherein the vibration apparatus comprises a first housing and a second housing, and the second housing is combined to the first housing to form an inner cavity of the vibration apparatus,
- wherein the vibration assembly is suspended in the inner cavity, and
- wherein in the inner cavity, the stator assembly is fixed on the first housing.

7. The vibration apparatus of claim 6, wherein an edge of the first housing is provided with a connecting portion corresponding to the elastic member, and the elastic member is connected to the connecting portion, and
- wherein the connecting portion is recessed inward relative to the edge of the first housing.

8. The vibration apparatus of claim 7, wherein a partial region of the edge of the first housing protrudes outward, and is bent to form the connecting portion.

9. The vibration apparatus of claim 7, wherein the first housing has a rectangular structure, and the connecting portion is disposed on a short side of the rectangular structure.

\* \* \* \* \*